S. GOGEL.
AUTOMOBILE.
APPLICATION FILED NOV. 6, 1917.

1,278,907.

Patented Sept. 17, 1918.

INVENTOR
SOL GOGEL

UNITED STATES PATENT OFFICE.

SOL GOGEL, OF TORONTO, ONTARIO, CANADA.

AUTOMOBILE.

1,278,907.

Specification of Letters Patent.    Patented Sept. 17, 1918.

Application filed November 6, 1917.   Serial No. 200,573.

*To all whom it may concern:*

Be it known that I, SOL GOGEL, of the city of Toronto, in the county of York, in the Province of Ontario, Canada, have invented certain new and useful Improvements in Automobiles, of which the following is the specification.

My invention relates to improvements in automobiles and the object of the invention is to provide means for preventing cutting of a tire on the rim due to traveling on a deflated tire and it consists essentially of a supplemental wheel secured to the hub of an ordinary automobile wheel and having its outer circumference or tread located between the rim and the outer circumference or tread of the automobile wheel as hereinafter more particularly explained.

In the drawings like characters of reference indicate corresponding parts in the various figures.

Figure 1:
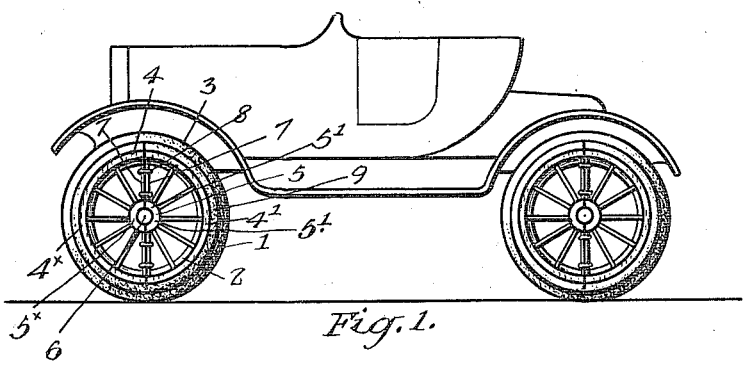
Figure 1, is a side elevation of an automobile showing my invention applied thereto.
Figure 2:
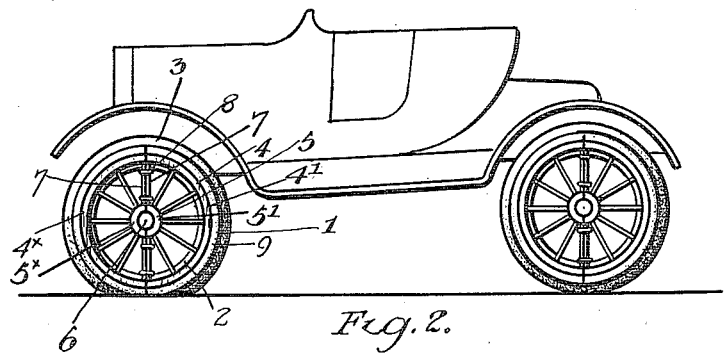
Fig. 2 is a similar view to Fig. 1, showing one of the tires deflated.
Figure 3:
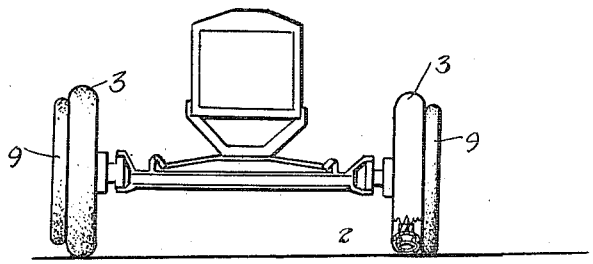
Fig. 3, is a front elevation of an automobile showing one of the tires deflated, the lower portion thereof being shown in section.

1 indicates the ordinary wheels of an automobile provided with a rim 2 and pneumatic tire 3. 4 indicates a supplemental wheel, which is preferably formed in two halves $4^x$ and $4'$, the divided hub 5 thereof surrounding the ordinary hub 6 of the automobile wheel. Each half $5^x$ and $5'$ of the hub is provided with a spoke member 7 in close proximity to the point of division. The spoke members 7 of each half of the wheel $4^x$ and $4'$ are clamped together and secured by suitable U-bolts 8. Each wheel portion $4^x$ and $4'$ may be provided with a tread portion 9 of hard rubber, the outer circumference of which is located between the outer diameter of the rim 2 and the outer circumference of the pneumatic tire 3.

It will be understood that a supplemental wheel 4 is mounted upon each hub 6 of the automobile and that when one of the tires becomes deflated through puncture the wheel 4 comes into contact with the ground, the automobile riding thereon, the position of the outer circumference of the wheel 4 being such as to prevent pinching of the pneumatic tire 3 against the rim 2 and thereby preventing the consequent cutting or wearing out of the inner tube of the tire.

It will thus be seen that when a puncture takes place the travel of the automobile may be continued without any damage to the tire of the automobile until the destination is reached when the tire may be repaired.

What I claim as my invention is—

In an automobile, the combination with the wheel and its hub, of a supplemental wheel permanently mounted upon the hub, being of less diameter than the main wheel and adapted to support the machine in case of the deflation of the main tire, the said supplemental wheel being divided into two sections so as to engage each side of the hub, each portion being arranged with spoke members on the line of the division whereby the spokes of each half are adapted to fit closely together and U-bolts for clamping the adjacent spoke members to prevent displacement.

SOL GOGEL.

Witnesses:
M. EGAN,
R. MOFFET.